UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

PROCESS OF REDUCING PRODUCTS OF CARBON MONOXIDE

No Drawing. Original application filed September 9, 1925, Serial No. 55,393. Divided and this application filed November 10, 1927. Serial No. 232,476.

This invention relates to a process of preparing reduction products of carbon monoxide. More particularly the invention relates to a catalytic reduction of carbon monoxide in presence of hydrogen or gases containing hydrogen in stages under optimum conditions for each stage.

Carbon monoxide is reduced in definite stages according to the following reactions:

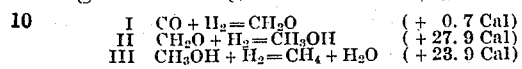

I   $CO + H_2 = CH_2O$           ( + 0.7 Cal)
II  $CH_2O + H_2 = CH_3OH$       ( + 27.9 Cal)
III $CH_3OH + H_2 = CH_4 + H_2O$ ( + 23.9 Cal)

The physical agencies such as heat pressure and electrical discharges and the chemical catalysts which favor the reactions in the different stages are not the same and in order to produce maximum efficiency each stage should be carried out in the presence of the catalyst particularly suited to the reactions and under the conditions of heat and pressure which are most favorable. In the past no attempt has been made to reduce carbon monoxide in stages at all, much less under the optimum conditions for each stage. It constitutes one of the features of the present invention that the reactions for each of the three stages are caused to take place under the conditions of heat, pressure and chemical catalysts best suited to produce a maximum conversion in each stage.

The reactions are reduction or hydrogenation reactions and the catalysts to be used belong to the general class of reduction catalysts. I have found, however, that all reduction catalysts are not equally effective in the different stages and that it is necessary to accurately proportion and tune the catalysts for each stage. Thus many reduction catalysts in concentration suitable for good yields tend to carry the reactions too rapidly through the stages and result in the formation of large amounts of methane and side reactions. I have found therefore that it is necessary for best results to damp the activity of the catalysts in stages I and II and this constitutes a further feature of my invention.

For the purpose of the present invention, reduction catalysts may be divided into two main classes namely, strong reduction catalysts such as iron, nickel, cobalt and palladium, and mild reduction catalysts such as copper, manganese, cadmium, zinc, lead, tin, magnesium, silver, gold and platinum. The elements may be present in the form of the metals, their oxides, hydroxides, salts, both simple and complex, and other compounds. In the case of zinc I have found that the best results are produced when part at least of the element is in the form of zinc dust and this constitutes one of the features of the invention. Single catalysts may be used or mixtures of different catalysts.

I have found that even the mild reduction catalysts referred to above tend to cause too violent reactions, particularly at higher temperatures, for example, temperatures in excess of 300° C., and tend to produce side reactions such as the formation of higher alcohols ketones, higher aldehydes, acids and paraffines or mixtures of the above, and result in large yields of methane.

I have found that the activity of the mild reduction catalysts may be damped by mixing or combining these catalysts with catalysts having opposite functions, namely, oxidation catalysts. Among the oxidation catalysts I include those which are commonly used in the vapor phase, catalytic oxidation of organic compounds, such as compounds of chromium, vanadium, manganese, titanium, molybdenum, tungsten, cerium, thorium, uranium, zirconium and the like. These catalysts may be in the form of their oxides,—salts, both simple and complex, and other compounds. Single oxidation catalysts may be used as diluents to damp the activity of the reduction catalysts or mixtures of different oxidation catalysts may be so used. The catalysts may be used as such or may be coated on or absorbed in carriers such as pumice, asbestos, kieselguhr, silica, porcelain, calcined magnesia, soapstone, roughened quartz, silicates and similar materials.

According to the present invention the catalysts for at least two stages are mixed together so that the reaction conditions for the different stages may balance each other. Thus, for example, the endothermic reaction in stage I may serve to absorb in situ the heat produced in the exothermic stages of II and III.

The reduction and oxidation catalysts may be separately formed and the fragments mixed or arranged in layers or a particular mixture of best efficiency can be achieved by impregnating solutions of reduction and oxidation catalysts into porous carriers.

The strong reduction catalysts, iron, nickel, cobalt and palladium should be avoided or used in great dilutions. I have found that for certain purposes concentrations not exceeding 3% of the strong reduction catalysts may be used. It is not sufficient to avoid the presence of strong reduction catalysts in stages I and II at the beginning of the reactions but it is necessary to prevent deposition of any of these catalysts on the mild reduction catalysts during operation of the converter. It is thus necessary to prevent the strong reduction catalysts in any form from entering the gas stream.

The reactions in all of the stages are equilibrium reactions and when it is desired to separate the reduction product of any particular intermediate stage, it must be rapidly removed from the reaction gases which can be brought about in the case of formaldehyde by sudden cooling and absorption in water. This may be advantageously carried out by means of a water spray or by passing the gases through an absorption tower after passing through the converter in which the reaction of stage I is carried out.

Owing to the fact that the reactions are equilibrium reactions, a high gas speed is desirable and should preferably be sufficiently high so that the volume of gas in the converter or converters is changed more than thirty times an hour.

The reduction can be carried out in separate converters for each stage using the temperature and pressure best suited for that particular stage and if necessary, supplying additional gas between stages. Thus stage I may be carried out in one converter, the gases compressed and forced into another converter mixed with additional hydrogen or hydrogen containing gases where necessary, reduced further in the second converter according to the reaction of stage II and finally reduced in a third converter with or without the addition of additional hydrogen. The intermediate products, formaldehyde and methyl alcohol, may be removed in whole or in part. The reduction can also be carried out by combining two or more stages in a single converter arranging the different catalysts in zones or mixed together or alternating zones of the various stages. The alternation of catalytic zones tuned to the different stages is of advantage particularly where stage I and stage II are combined since the reaction of stage II removes formaldehyde formed in stage I and thus upsets the equilibrium so that the further formaldehyde is rapidly formed by bringing the remaining gases into contact with more of the catalyst which is particularly suited for the raction of stage I.

Stage I represents a slightly endothermic reaction and takes place with reduction in volume. I have found that at temperatures above 450° C. efficiency falls as the formaldehyde formed rapidly decomposes at such temperatures and there is an increased tendency to form side reactions. 450° C. therefore represents the upper limit for efficient operation and 200° C. is, roughly the lower limit, as the reaction proceeds too slowly at lower temperatures to be economically used. Pressure aids the reaction but the pressure used should be determined in combination with the activity of the catalysts and the temperature, as higher pressures not only tend to accelerate the reaction of stage I but they also tend to cause side reactions particularly condensation reactions of formaldehyde.

The proportions of carbon monoxide and hydrogen may be that of equal volumes but I have found that an excess of hydrogen is desirable as it not only pushes the equilibrium toward the production of formaldehyde in accordance with the mass action law but, due to the peculiar character of the catalysts used, the excess hydrogen does not exert any deleterious effects.

The catalysts used consist of a mixture of mild reduction catalysts and oxidation catalysts and I have found that it is important that the latter should be in excess. The catalysts may be mixtures of oxidation and reduction catalysts or porous or inert carriers impregnated with a mixture of oxidation or reduction catalysts. For some catalysts a very effective form is produced by pressing finely powdered mixtures of the catalysts into the form of granules or fragments which show great efficiency.

The presence of strong reduction catalysts should be avoided and if an iron converter or a converter consisting of a nickel alloy is used it should preferably be provided with a lining which is inert or a mild reduction catalyst, for example, copper linings may be advantageously used in many cases.

Formaldehyde may be recovered by sudden cooling, preferably by means of a water spray. Where the formaldehyde is not to be recovered the gases with or without addition of hydrogen may be directly introduced into a second converter after cooling and there further reduced to methyl alcohol or methane.

The transformation of formaldehyde into methyl alcohol, according to the reaction of stage II, is a strongly exothermic reaction and accordingly excessive temperatures should be avoided particularly in combination with extreme pressures in order to prevent the production of side reactions and large amounts of methane. Where the reaction is carried out in a separate converter, the gases from the first stage, with or without separation of some of the formaldehyde formed, are pumped after cooling into a converter at high pressure and any added hydrogen or hydrogen containing gases which may be necessary may be directly pumped into the converter. In general, the pressure used in stage II are much higher than those in stage I but a wide variation is possible.

I have found that a very advantageous method of carrying out stages I and II in separate converters consists in connecting these converters to separate stages of a multi-stage compressor. The converter in which stage I is carried out is connected to the low pressure stage of the compressor and the gases from the first converter are fed into a higher pressure stage of the compressor together with any additional hydrogen which may be necessary and pumped into the second converter.

The catalysts used in the conversion of the formaldehyde to methyl alcohol consist in a mixture of mild reduction and oxidation catalysts but the proportions are different from those required in the first stage. Instead of an excess of oxidation catalysts there should be an excess of reduction catalysts. The catalysts may be produced in any of the ways described in connection with the catalysts for stage I. Strong reduction catalysts should be avoided, both in the original catalyst charge of the converter and the material of the converter walls. Care should also be taken to prevent the introduction of strong reduction catalysts in any form in the gas stream, as has been described in connection with stage I. The presence of strong reduction catalysts in extremely high dilutions may be tolerated but they should not be in excess of 3% of the total catalyst weight.

The methanol produced in stage II may advantageously be recovered from the exhaust gases by cooling followed by absorption in activated charcoal, silica-gel, or similar absorbents. Solvents of methanol may also be used. The reaction is preferably carried out in a rapidly moving gas stream which should have about the same velocity as in stage I, namely, sufficient to change the gas volume in the converter more than thirty times per hour.

Stages I and II may advantageously be combined in a single converter and this method presents many advantages. Formaldehyde is a relatively unstable compound whereas methyl alcohol is comparatively stable and by carrying out the reaction in a single converter, particularly where alternate layers or zones of formaldehyde and methyl alcohol catalyst are used, the formaldehyde formed is at once reduced to methyl alcohol and this permits the production of further amounts of formaldehyde in the next succeeding formaldehyde catalysts zone, owing to the fact that the equilibrium is upset by the removal of formaldehyde. A similar effect is produced by mixing the two catalysts together. When the reaction is carried out in a single converter formaldehyde of course cannot be recovered and the main product is methanol.

Owing to the exothermic character of the reaction in stage II, it is of great importance to prevent local over-heating of portions of the catalyst with a resulting decomposition, formation of side reactions and over-reductions. High gas velocities which have been referred to above are one of the means which I have found to be advantageous in preventing the local over-heating and I have also found that the use of zones of catalysts of increasing activity in the direction of the gas stream are very effective in preventing local over-heating since the most active catalysts contact with the most nearly spent gases and the evolution of heat is evenly distributed over all of the catalyst. The endothermic stage I is further aided by the exothermic stage II. The increasing activity of catalysts in the direction of the gas flow may be brought about in various ways. The concentration of the catalysts may be varied. Proportions of reduction and oxidation catalysts may be varied to bring about an increasing percentage of reduction catalysts in the direction of gas flow and different catalysts of increasing specific catalytic activity may be used, thus, for example, relatively weak surface effect catalysts such as activated carbon, coke and similar porous materials may be present in the first part of the catalyst layer, followed by catalysts containing elements and compounds of tin, silver, gold, lead, copper, cadmium, zinc, in the order named which represents a series of increasing activity. The oxidation catalysts may also be present in a series of decreasing activity in the direction of the gas flow and I have found that such a series for the methanol stage consists in thorium, cerium, zirconium, vanadium, titanium, molybdenum, uranium, manganese and chromium. Various combinations of these methods may also be used but the net effect should always be an increasing reduction catalyst activity in the direction of the gas flow and care should be taken not to use reduction catalysts in excess in any layer used in stage I.

The gases coming from the methyl alcohol converter with or without recovery of methyl alcohol can be further reduced to methane in a separate converter, with or without pressure, at temperatures above 150° C. The strong reduction catalysts, iron, nickel, cobalt and palladium should be used in large quantities singly or in combination and should be accompanied by dehydrating catalysts since the reaction consists not only in a reduction but also in a splitting off of water. The following may be used as dehydrating catalysts: thorium oxide, aluminum oxide, chromous oxide, silicon dioxide, titanium dioxide, beryllium oxide, zirconium dioxide, molybdenum pentoxide, ferric oxide, vanadium trioxide, zinc oxide and uranium oxide. Both types can be partly or wholly in the form of their oxides, easily decomposed compounds, salts (simple and complex) or other compounds singly or in combination. The proportions of reduction and dehydrating catalysts may be varied but I have found that it is advantageous to use the reduction catalysts in excess.

Stage III is strongly exothermic and tends to proceed violently. A very rapid gas flow must be used when operating under pressure and preferably the converter should be cooled. I have found that a gas speed sufficient to change the gas volume in the converter at least thirty times or more an hour is desirable. If the above mentioned precautions are not taken the reaction may become uncontrollable and the catalysts become inoperative. 600° C. is the upper limit and from 200° C. up commercially practical reaction velocities are rendered possible. The gases before entering the methane converter may advantageously be so changed in composition by the addition of hydrogen or gases rich in hydrogen that the final gas after passing through the converter is pure methane.

The reduction of carbon monoxide to methane in stages as described above presents the advantage that the evolution of heat in the stages II and III is divided over the three stages and the danger of over-heating the catalysts in the converter due to the very violent reaction is lessened. Thus comparatively large amounts of gas can be caused to react in a definite time and high pressure can be used without involving great difficulties from a heat engineering stand-point.

The methane process can also be combined with the formaldehyde and methyl alcohol steps above described in a single converter by mixing the methane catalysts with the formaldehyde and methyl alcohol catalysts. The activity of the catalysts may advantageously be increased in the direction of the gas flow as described above in connection with the production of the formaldehyde and methyl alcohol and the same methods or combinations can be used. The methane catalysts form a series of increasing catalytic activity as follows: iron, cobalt, nickel and palladium. A similar increase in activity in the direction of the gas flow can be carried out with the dehydrating catalysts by using this in the following series of increasing activity; zinc oxide, vanadium trioxide, ferric oxide, molybdenum pentoxide, uranium oxide, zirconium dioxide, beryllium oxide, titanium dioxide, silicon dioxide, chromous oxide, aluminum oxide, thorium oxide. A variation of activity, by varying the concentration may also be used either alone or combined with the use of different dehydrating catalysts of increasing activity in a manner similar to that described in connection with the reduction catalysts. Methane catalysts may also be used with inert cementing mixtures such as albumen, sugar, dextrine or catalytically active cementing materials such as potassium or sodium waterglass silica-gel or by a solution of alkali metal carbonates or hydroxides on inert carriers such as pumice, quartz, porcelain, earthenware, asbestos, kieselguhr and the like. Granules or fragments may also be formed by molding or pressing mixtures of catalysts and carriers in a finely divided state.

When the reactions of stages I, II and III are carried out in separate converters with varying pressures, the converters may advantageously be connected to various stages of a multi-stage compressor. Circulating pumps may, of course, also be used in connection with any single stage.

Other gases such as nitrogen, carbon dioxide, methane, rare gases of the air, and small amounts of oxygen are not harmful. The gases should, however, be free from contact poisons such as sulphur, arsenic, hydrogen phosphide and metal compounds which exert a deleterious action on the reduction catalysts.

The efficiency of the catalysts in all of the stages can be greatly enhanced by using catalyst carriers of great surface energy.

I have found that finely divided materials such as kieselguhr, colloidal silicic acid, asbestos flour, pumice flour, quartz flour or finely ground silicates having an average particle size of 20 microns or less when used as a carrier for the reduction and oxidation catalysts or reduction and dehydration catalysts greatly enhances their efficiency. In some cases the increase in efficiency amounts to 20% or more and finely divided carriers of this type may be considered as positive activators of the catalysts. I am not certain as to why the finely divided carriers exert this remarkable effect which appears to be much greater than that due to the mere increase in surface. I am of the opinion, however, that the colloidal character of the carriers, that is to say, the enormous surface compared to the volume of the voids between particles results in an increased gas pressure due to the surface energy of the particles and thus enhances the reaction which takes place in contact with the catalyst on the surfaces of the carrier particles. While I believe that the above is probably the true explanation of the increased effectiveness of the finely divided carriers having particles approaching colloidal size, I have been unable to prove this explanation rigorously and do not desire to limit my invention to any theory which may or may not subsequently prove to be true. A particularly effective method of impregnating finely divided carriers as described above, consists in the use of solutions of complex salts or compounds of the catalysts which are thus very evenly and finely distributed on the particles and on calcination leave the catalyst in an evenly distributed form having an immense surface.

The impregnated finely divided carriers are preferably formed into granules by pressing with or without a cementing material such as organic adhesives, sugar, dextrine and the like, or salts of zinc, lead or magnesium and potassium or sodium silicate. The granules are dried and calcined and if excess alkali is present it may advantageously be washed out. It should be understood, of course, that the finely divided material may be used as part or all of the carrier and may be associated with more massive carrier fragments as a coating. It is also unnecessary to use exclusively solutions of complex catalyst compounds or salts as impregnated media. While such solutions are preferable in most cases, other methods of impregnating the catalysts may be employed either singly or in combination with impregnation by means of solutions of complex catalytic compounds.

The invention will be described more fully in the following specific examples but it should be noted that the invention is not limited to the details therein set forth.

Example 1

A converter is charged with a catalyst formed by mixing 100 parts of ammonium vanadate, 100 parts of manganese carbonate and 25 parts of chromic acid with 500 parts of calcined kieselguhr. The mixture is preferably in the presence of sufficient moisture to form a soft dough or paste and this is treated with a solution of 25 parts of ammoniacal silver nitrate, 30 parts of cadmium nitrate, 10 parts of zinc nitrate and 3 parts of platinum chloride in the presence of about 10 parts of magnesium nitrate and 20 parts of water glass solution. The mixture is worked over and thickened until it can be formed into granules. The catalyst is first heated to about 300°–400° C. in a stream of air and then reduced with hydrogen at about 250°–300° C.

A purified water gas which is preferably prepared by the gasification of wood charcoal, and which contains about 48% hydrogen, 45.5% carbon monoxide, 4% nitrogen, 1% carbon dioxide and 1.5% methane is introduced into the low pressure stage of a compressor and compressed to about 5 to 10 atmospheres and heated to about 200°–300° C. whereupon it is passed over the catalyst in a very rapid stream.

Formaldehyde can be recovered in a good yield by a sufficiently rapid cooling of the gas stream, particularly by means of a water spray. Instead of removing formaldehyde the gases coming from the converter may be cooled and additional hydrogen added to bring the concentration of hydrogen to 70% or more and the gases then compressed in a high pressure stage of a compressor to about 200 atmospheres or higher and passed through a high pressure cylinder which may be advantageously lined with bronze.

The high pressure converter can be heated electrically either from the outside or from the inside, depending on the quality of the steel. When interior heating is used, the elements of the strong reduction catalysts are to be avoided in the resistance material, as otherwise carbon is precipitated. Preferably a current of low voltage and high amperage is used in order to simplify the problem of insulation. The heating may also be carried out by means of a high pressure coil or helix which is lined with copper on the outside and is built into the converter. Water under pressure or mercury or other suitable liquids may be used and are heated to the necessary temperature and pumped through the coil. The coil serves also to remove heat of reaction after the process is once started and this is a further advantage of the coil method of heating.

The catalyst is prepared as follows:

The first layer of catalyst consists in a mixture of 200 parts of kieselguhr, 20 parts of short fibre asbestos and 5 parts of dextrine to which is added an ammoniacal silver nitrate solution equivalent to 88 parts of silver oxide and an ammonium vanadate solution corresponding to 46 parts of $V_2O_5$. After evaporating the excess water the paste is formed into granules under pressure and dried. The next layer consists in 102 parts of molybdic acid, 98 parts of manganese oxide, 53 parts of lead oxide and 180 parts of zinc dust, which are mixed in a moist state and pressed into granules. The next layer is prepared by coating 264 parts of cadmium oxide with 180 parts of chromic acid in solution and treating with ammonium vanadate containing 5 parts of vanadic acid. After evaporating the excess water the mixture is pressed into granules, using starch as a binder if necessary. A layer of 138 parts of zinc dust, 52 parts of zinc oxide and 55 parts of chromium oxide follows. The catalyst is formed by mixing the moistened pasty mass, drying and pressing. Then follows a double layer of 84 parts zinc oxide, 64 parts zinc dust and 100 parts of chromic acid mixed with 200 parts of kieselguhr formed and dried.

The highly compressed gases from the formaldehyde converter are passed over the above described catalyst in the high pressure converter at about 300° to 400° C. at a high rate of speed. Preferably the gas speed should be high enough so that the volume of gas in the converter is changed more than thirty times per hour. The exhaust gases on cooling under pressure give excellent yields of methyl alcohol. The gaseous methyl alcohol remaining in the exhaust after cooling may be absorbed in activated carbon or similar absorbent.

The remaining gas can be returned to the first converter after adjusting its composition or it may be partially or wholly passed into a third converter with or without methyl alcohol. A considerable amount of additional hydrogen should be added and the gases should pass over a contact mass consisting in a layer of 100 parts of bauxite and 110 parts of reduced iron cemented with water glass, then through a layer consisting in a mixture of 120 parts of nickel carbonate and 10 parts of aluminum oxide impregnated into 100 parts of pumice fragments followed by a layer of 100 parts of thorium oxide fragments impregnated with 3 parts of palladium and 10 parts of nickel nitrate. A further layer of 150 parts of kieselguhr or colloidal silica impregnated with 30 parts of nickel applied in the form of nickel ammonium nitrate and 15 parts of aluminum oxide applied in the form of sodium aluminate. The pressure may advantageously be from 2 to 5 atmospheres and the temperature from 250° to 400° C. The product is mainly methane.

Example 2

A high pressure converter which may be advantageously formed by a plurality of steel tubes shrunk onto each other is provided with an inner lining of aluminum and contains the following catalyst layers:

1. 200 parts of kieselguhr and 18 parts of silver vanadate thoroughly mixed with 100 parts manganese dioxide and 6 parts of dextrine and formed into fragments.

2. 100 parts of thorium oxide coated with 9 parts of copper and 10 parts of zinc produced by evaporating complex ammonium salts of copper and zinc nitrate on the thorium oxide fragments.

3. Contact layers as described for the methyl alcohol converter in Example 1.

A gas mixture of 20%–35% carbon monoxide and 65%–85% hydrogen and containing less than ½% oxygen is passed through the converter at a temperature of 200°–450° C. and under a pressure of 250 atmospheres. The cover of the high pressure cylinder after charging with catalyst may advantageously be pressed into a conical packing by hydraulic pressure and then screwed tight. The exhaust gases contain large amounts of methyl alcohol and can be worked up to methane in a further converter as described in Example 1 or the methyl alcohol may be recovered. In the latter case, the remaining gases may advantageously be recirculated with suitable additions of fresh gas.

Instead of the layers of methyl alcohol catalysts described in Example 1, the following contact layer can be efficiently used as the third layer in the converter. 130 parts of cadmium oxide, 220 parts of lead oxide, 200 parts of chromic acid and potassium silicate in amounts less than those corresponding to 100 parts KOH are mixed thoroughly with 300 parts of kieselguhr dried at 200° C. in carbon dioxide current. The dried mass can be freed from alkali by washing with water and may then be dried again and broken into fragments. A further excellent contact layer is formed by a mixture of 130 parts cadmium oxide, 10 parts zinc dust, 200 parts chromic acid, mixed with potassium silicate solution containing not more than 100 parts of KOH kneaded warm with 300 parts of colloidal silica and then heated to incipient sintering. After cooling, the mass can be freed from alkali and is broken into fragments.

Example 3

A high pressure converter provided with an aluminum lining in the inner tube, is charged with the catalyst mentioned in Example 2 and further with a deep layer of catalyst as described in connection with the methane converter in Example 1, and a mixture of 25 volumes of carbon monoxide and 75 volumes of hydrogen is passed through at a pressure of 20 atmospheres and 300° C., the gas speed being exceedingly high. The excess reaction heat can be effectively removed by a cooling coil through which water is pumped at high pressure, a good yield of methane resulting.

It will be seen that the present invention provides a novel and improved method of reducing carbon monoxide operating on a different chemical principle than has been hitherto employed. The invention also includes improvements in each of the three stages of reduction and these improved stage reactions, as well as the combination of stages, are included in my invention.

A further important advantage and feature of the present invention consists in the highly effective catalysts used in the various stages associated with or impregnated on finely divided material having an average particle size of 20 microns or less. The impregnation of these finely divided carriers wholly or in part by solutions of complex compounds or salts of the catalytic elements constitutes a further advantage and feature and produces a catalytic layer on the carrier particles which is of great uniformity and homogeneity and is exceedingly effective in the reaction.

On the contrary, in the present application I claim the use of these novel contact masses only as a feature of the reduction of carbon monoxide in stages according to the process of the present invention.

In the claims the expressions "mild reduction catalysts", "strong reduction catalysts", "oxidation catalysts" and "dehydration catalysts" are intended to include the compounds of the chemical elements referred to under these terms in the specification, or the elements themselves, singly or in combination.

This application is a division of my co-pending application, Serial No. 55,393, filed September 9, 1925.

What is claimed as new is:

1. A process of reducing carbon monoxide and carbon monoxide containing gases which comprises causing the gas to react with hydrogen containing gases in successive stages to form formaldehyde and methyl alcohol, without isolating intermediate products formed, the catalysts for the stages being mixed together.

2. A process of reducing carbon monoxide and carbon monoxide containing gases which comprises causing the gas to react with hydrogen containing gases in successive stages to form formaldehyde and methyl alcohol, without isolating intermediate products formed, the catalysts for the stages being mixed together.

3. A process according to claim 1, in which each stage is carried out in the presence of a catalyst specific to the stage reaction.

4. A process according to claim 2, in which each stage is carried out in the presence of a catalyst specific to the stage reaction.

5. A process according to claim 1, in which the first two stages take place in the presence of mild reduction catalysts associated with oxidation catalysts.

6. A process for producing methyl alcohol which comprises causing a gas containing carbon monoxide to react with hydrogen containing gases in the presence of catalysts favoring the production of formaldehyde and causing the formaldehyde so produced, without separation from the gas stream, to react with hydrogen in the presence of catalysts favoring the production of methyl alcohol, at least a part of the catalysts for both reactions being mixed together in a single layer.

7. A process according to claim 6 in which the catalysts for both stages consist of mild reduction catalysts associated with oxidation catalysts.

8. A process according to claim 6 in which the catalysts for at least one of the stages consists of mild reduction catalysts admixed with oxidation catalysts.

9. A process according to claim 6 in which the formaldehyde catalyst consists of mild reduction catalysts associated with an excess of oxidation catalysts.

10. A process according to claim 6 in which the methyl alcohol catalyst consists of an excess of mild reduction catalysts associated with oxidation catalysts.

11. A method according to claim 6 in which the gases, converters and the catalysts used in carrying out the reaction are substantially free from strong reduction catalysts.

Signed at Pittsburgh, Penna., this 5th day of November, 1927.

ALPHONS O. JAEGER.